(12) United States Patent
Sawaki

(10) Patent No.: US 8,696,131 B2
(45) Date of Patent: Apr. 15, 2014

(54) POLARIZATION ELEMENT AND PROJECTOR

(75) Inventor: Daisuke Sawaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 401 days.

(21) Appl. No.: 13/005,110

(22) Filed: Jan. 12, 2011

(65) Prior Publication Data

US 2011/0205457 A1    Aug. 25, 2011

(30) Foreign Application Priority Data

Feb. 19, 2010    (JP) .................................. 2010-034377

(51) Int. Cl.
*G03G 21/14* (2006.01)

(52) U.S. Cl.
USPC .................. 353/20; 359/30; 359/31; 359/34; 359/38; 359/98; 359/485.05; 359/489.08; 385/11

(58) Field of Classification Search
USPC ............................ 353/20, 30, 31, 94, 98, 122; 359/485.05, 489.03, 489.07, 489.08, 359/489.09; 349/5, 7–9, 69; 385/11, 37; 362/19

See application file for complete search history.

(56) References Cited

U.S. PATENT DOCUMENTS

| | | | | |
|---|---|---|---|---|
| 6,122,103 | A * | 9/2000 | Perkins et al. ........... | 359/485.03 |
| 6,714,350 | B2 * | 3/2004 | Silverstein et al. ...... | 359/485.05 |
| 7,158,302 | B2 * | 1/2007 | Chiu et al. ............... | 359/485.03 |
| 7,233,563 | B2 | 6/2007 | Ueki et al. | |
| 7,722,194 | B2 | 5/2010 | Amako et al. | |
| 7,755,718 | B2 | 7/2010 | Amako et al. | |
| 2008/0137188 | A1 * | 6/2008 | Sato et al. ............... | 359/486 |
| 2008/0186576 | A1 * | 8/2008 | Takada ..................... | 359/492 |
| 2008/0303986 | A1 * | 12/2008 | Yamaki et al. .......... | 349/96 |
| 2008/0304004 | A1 | 12/2008 | Amako et al. | |
| 2008/0304153 | A1 * | 12/2008 | Amako et al. .......... | 359/486 |
| 2008/0316599 | A1 * | 12/2008 | Wang et al. ............. | 359/486 |
| 2010/0188747 | A1 | 7/2010 | Amako et al. | |
| 2010/0238555 | A1 | 9/2010 | Amako et al. | |
| 2011/0115991 | A1 | 5/2011 | Sawaki | |

FOREIGN PATENT DOCUMENTS

| | | |
|---|---|---|
| CN | 1629659 A | 6/2005 |
| JP | 2004-205880 A | 7/2004 |
| JP | A-2005-37900 | 2/2005 |
| JP | A-2006-133275 | 5/2006 |
| JP | 2007-310249 A | 11/2007 |
| JP | A-2009-15302 | 1/2009 |
| JP | A-2009-15305 | 1/2009 |
| JP | A-2009-64005 | 3/2009 |
| JP | A-2010-101965 | 5/2010 |
| JP | 2011-170135 A | 9/2011 |

\* cited by examiner

*Primary Examiner* — Sultan Chowdhury
(74) *Attorney, Agent, or Firm* — Oliff PLC

(57) ABSTRACT

A polarization element includes: a substrate; and a plurality of grid sections arranged on the substrate, wherein the grid sections each have protruding sections and recessed sections alternately arranged in a longitudinal direction of the grid sections at a pitch shorter than a wavelength of incident light, in the plurality of grid sections, the arrangement pitch P of the protruding sections is the same, and a proportion (D=L/P) of a length L of the protruding section to the arrangement pitch P of the protruding sections is the same, and a height of the protruding sections is different between the grid sections adjacent to each other.

10 Claims, 11 Drawing Sheets

POLARIZATION ELEMENT AND PROJECTOR

BACKGROUND

1. Technical Field

The present invention relates to a polarization element and a projector.

2. Related Art

Recent years, wire grid polarization elements have been known as optical elements having a polarization separation function. The wire grid polarization elements are each obtained by forming a nanoscale wire section (thin metal wires) on a light transmissive substrate such as a glass substrate so as to line the substrate with the wire section. The wire grid polarization elements have a characteristic of having a high polarization separation performance, and in addition, being superior in heat resistance to polarization elements made of organic materials since the wire grid polarization elements are made of inorganic materials. Therefore, use of wire grid polarization elements instead of polarization separation elements made of polymeric materials in the related art is considered in various optical systems. Specifically, the wire grid polarization elements are preferably used as polarization elements for light valves of liquid crystal projectors exposed to the light from high power light sources, and are disposed in front of and behind (at least either one of the light entrance side and the light exit side) the light valves.

Incidentally, on the light exit side of the light valve, the function of absorbing the unwanted polarized light is required. This is because, if the unwanted polarized light is reflected on the light exit side of the light valve, there might arise a problem that the reflected light enters the light valve again to cause temperature rise in transistors, which makes the grayscales out of order, or to become stray light, which degrades the image quality.

Therefore, there has been considered various types of wire grid polarization elements of an absorption type provided with a function of absorbing the unwanted polarized light. For example, in JP-A-2005-37900 (Document 1), the unwanted polarized light is selectively absorbed by a polarization element having a first grating layer with light reflecting property formed on a substrate attached with a second grating layer (an absorbing layer) with a light absorbing property.

On the other hand, in JP-A-2006-133275 (Document 2), there is proposed a polarization element having a light transmissive substrate having steps formed on the surface with a pitch longer than the wavelength of the incident light, and light reflecting bodies arranged on the surface of the light transmissive substrate in a striped manner with a pitch shorter than the wavelength of the incident light. Thus, the stray light is prevented from occurring by reflecting the unwanted polarized light component with an angle but not specularly.

However, in Document 1, since deposition of the absorbing layer is required in addition to formation of the polarization element, and therefore, the structure of the element becomes complicated to thereby raise the manufacturing cost.

SUMMARY

An advantage of some aspects of the invention is to provide a polarization element and a projector capable of selectively absorbing unwanted polarized light to thereby be superior in grayscale expression, realize high-quality image display, and further simplify the element structure to achieve cost reduction.

A polarization element according to an aspect of the invention includes a substrate, and a plurality of grid sections arranged on the substrate, wherein the grid sections each have protruding sections and recessed sections alternately arranged in a longitudinal direction of the grid sections at a pitch shorter than a wavelength of incident light, in the plurality of grid sections, the arrangement pitch P of the protruding sections is the same, and a proportion (D=L/P) of a length L of the protruding section to the arrangement pitch P of the protruding sections is the same, and a height of the protruding sections is different between the grid sections adjacent to each other.

According to this configuration, by adopting the resonant grating structure having the protruding sections arranged on the thin metal wires at a pitch shorter than the wavelength of the incident light, it becomes possible to develop the surface plasmon resonance (SPR) to thereby selectively absorb the linearly polarized light TE (unwanted polarized light) with a specific wavelength entering the polarization element. Specifically, when the linearly polarized light TE enters the resonant grating structure described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced. Therefore, it becomes possible to provide the polarization element capable of selectively absorbing unwanted polarized light to thereby be superior in grayscale expression, and realize high-quality image display. Further, since it is not required to provide the absorbing layer, which is provided in the case of Document 1, it becomes possible to simplify the element structure to thereby achieve cost reduction.

Further, since in the present embodiment the arrangement pitch P of the protruding sections and the proportion (the proportion D=L/P) of the length L of the protruding section to the arrangement pitch P of the protruding sections are the same between the grid sections, and the height of the protruding sections is different between the grid sections adjacent to each other, the wavelength of the linearly polarized light TE which can be absorbed is different between the grid sections, and as a result, the wavelength range of the linearly polarized light which can be absorbed can dramatically be expanded. Therefore, since the reflectance can be decreased in a broad wavelength range, the design margin thereof increases when applying the polarization element to the projectors, and a more user-friendly polarization element can be obtained.

Further, it is preferable that a plurality of grid groups each having first one of the grid sections having the protruding sections with a first height and second one of the grid sections having the protruding sections with a second height is disposed on the substrate, and a width of the grid group in an arrangement direction of the grid sections is smaller than the wavelength of the incident light.

According to the configuration described above, it becomes possible to make the wavelength range of the linearly polarized light, which can be absorbed, be different between the grid sections adjacent to each other. Further, it becomes possible to set the height of the protruding sections in accordance with the incident light. Further, by previously determining several heights of the protruding sections, the element design becomes easy, and the manufacturing thereof also becomes easy.

Further, it is preferable that the protruding sections and the recessed sections provided to the same grid section have lengths equal to each other.

According to this configuration, since the lengths of the protruding sections and the recessed sections provided to the same grid section are arranged to be equal to each other, the manufacturing thereof becomes easy. Further, since it becomes easy for the surface plasmon to be excited in every grid section, the energy of the incident light is consumed, and the reflection toward the entering direction of the light can sufficiently be reduced.

Further, it is preferable that a plurality of types of grid sections having the respective heights of the protruding sections different from each other is arranged irregularly on the substrate.

According to this configuration, by appropriately performing the design of irregularly arranging the plurality of types of grid sections with the heights of the protruding sections different from each other on the substrate, it is possible to obtain the polarization element having a preferable optical characteristic.

A polarization element according to another aspect of the invention includes a substrate, and a plurality of grid sections arranged on the substrate, wherein the grid sections each have protruding sections and recessed sections alternately arranged in a longitudinal direction of the grid sections at a pitch shorter than a wavelength of incident light, the arrangement pitches of the protruding sections of the respective grid sections are equal to each other, and the proportion (the proportion $D=L/P$) of the length L of the protruding section to the arrangement pitch P of the protruding sections is different between the grid sections adjacent to each other.

According to this configuration, by adopting the resonant grating structure having the protruding sections arranged on the thin metal wires at a pitch shorter than the wavelength of the incident light, it becomes possible to develop the surface plasmon resonance (SPR) to thereby selectively absorb the linearly polarized light TE (unwanted polarized light) with a specific wavelength entering the polarization element. Specifically, when the linearly polarized light TE enters the resonant grating structure described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced. Therefore, it becomes possible to provide the polarization element capable of selectively absorbing unwanted polarized light to thereby be superior in grayscale expression, and realize high-quality image display. Further, since it is not required to provide the absorbing layer, which is provided in the case of Document 1, it becomes possible to simplify the element structure to thereby achieve cost reduction.

Further, since in the present embodiment the arrangement pitch P of the protruding sections is the same while the proportion ($D=L/P$) of the length L of the protruding section to the arrangement pitch P of the protruding sections is different between the grid sections adjacent to each other, the wavelength of the linearly polarized light TE which can be absorbed is different between the grid sections, and as a result, the wavelength range of the linearly polarized light which can be absorbed can dramatically be expanded. Therefore, since the reflectance can be decreased in a broad wavelength range, the design margin thereof increases when applying the polarization element to the projectors, and a more user-friendly polarization element can be obtained.

Further, it is preferable that a protrusion height of the protruding sections with respect to the recessed sections is different between the grid sections adjacent to each other.

According to the configuration described above, it becomes possible to make the wavelength range of the linearly polarized light, which can be absorbed, be different between the grid sections adjacent to each other. Further, it becomes possible to set the height of the protruding sections in accordance with the incident light. Further, by previously determining several heights of the protruding sections, the element design becomes easy, and the manufacturing thereof also becomes easy.

Further it is preferable that a plurality of grid groups each having first one of the grid sections having the protruding sections with a first proportion and second one of the grid sections having the protruding sections with a second proportion is disposed on the substrate, and a width of the grid group in an arrangement direction of the grid sections is smaller than the wavelength of the incident light.

According to the configuration described above, it becomes possible to make the wavelength range of the linearly polarized light, which can be absorbed, be different between the grid sections adjacent to each other. Further, it becomes possible to set the proportion D of the protruding sections of the grid section in accordance with the incident light. Further, by previously determining several proportions D of the protruding sections of the grid sections, the element design becomes easy, and the manufacturing thereof also becomes easy.

Further it is preferable that a plurality of types of grid sections having respective proportions of the protruding sections different from each other is arranged irregularly on the substrate.

According to this configuration, by appropriately performing the design of irregularly arranging the plurality of types of grid sections with the respective proportions of the protruding sections different from each other on the substrate, it is possible to obtain the polarization element having a preferable optical characteristic.

Further, it is preferable that the grid sections, the protruding sections, and the recessed sections each have a rectangular shape in a side view.

According to this configuration, the grid sections, the protruding sections, and the recessed sections each have a rectangular side-view shape, and are therefore, easy to manufacture. Specifically, these constituents can easily be manufactured by forming the metal film on the substrate, and then performing anisotropic etching of reactive ion etching (RIE) thereon using the resist pattern as a mask. Therefore, it becomes possible to improve the production efficiency to thereby achieve the cost reduction.

According to still another aspect of the invention, there is provided a projector including a lighting optical system adapted to emit a light beam, at least one liquid crystal light valve adapted to modulate the light beam, at least one polarization element according to the aspect of the invention described above, to which the light beam modulated by the liquid crystal light valve is input, and a projection optical system adapted to project a polarized light beam, which is transmitted through the polarization element, to a projection surface.

According to this configuration, since the polarization element related to the above aspect of the invention is provided, the deterioration of the polarization element can be prevented even in the case of using a high-power light source. Therefore, there can be provided the projector superior in grayscale expression, capable of realizing high-quality image display, and achieving cost reduction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
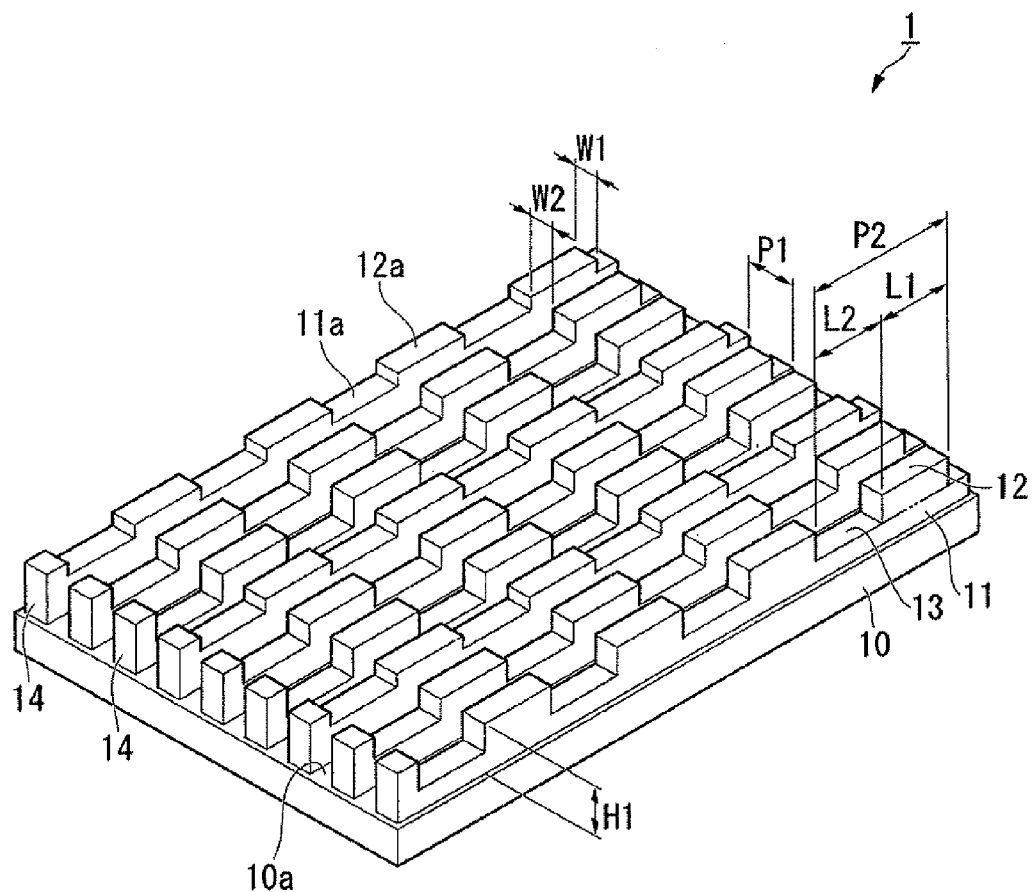
FIG. 1 is a perspective view showing a schematic configuration of a polarization element according to a first embodiment of the invention.

Hereinafter, some embodiments of the invention will be described with reference to the accompanying drawings. The embodiments each show an aspect of the invention, but do not limit the scope of the invention, and can arbitrarily be modified within the scope of the invention. Further, in the drawings explained hereinafter, in order for making each constituent easy to understand, the actual structures and the structures of the drawings are different from each other in scale size, number, and so on.

It should be noted that in the following explanations, an XYZ coordinate system is assumed, and positional relationships between the respective members will be explained with reference to the XYZ coordinate system. On this occasion, it is assumed that a predetermined direction in a horizontal plane is an X-axis direction, a direction perpendicular to the X-axis direction in the horizontal plane is a Y-axis direction, and a direction perpendicular to both of the X-axis direction and the Y-axis direction is a Z-axis direction.

Polarization Element of First Embodiment

Figure 2A:
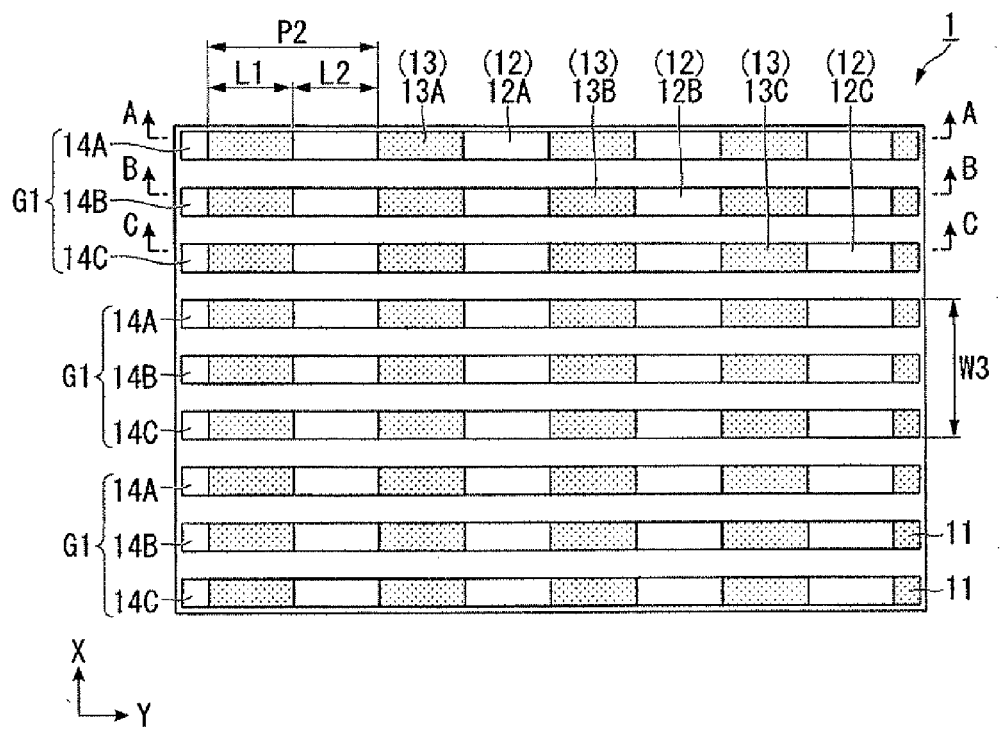
FIG. 2A is a plan view showing a schematic configuration of the polarization element.

FIG. 1 is a perspective view showing a schematic configuration of a polarization element according to a first embodiment of the invention. FIG. 2A is a plan view showing a schematic configuration of the polarization element, and FIG. 2B is a partial cross-sectional view showing a schematic configuration of the polarization element.

Figure 2B:
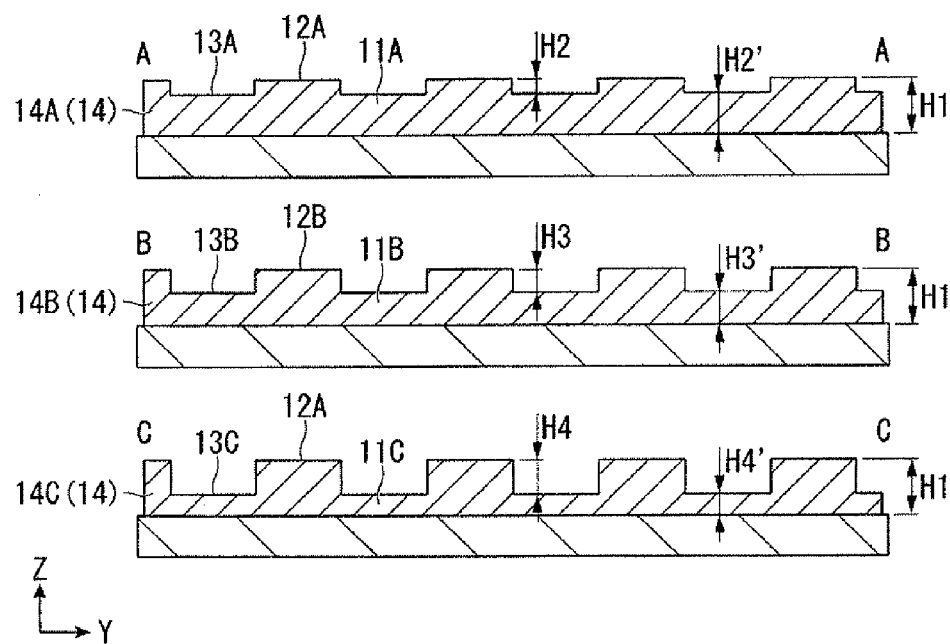
FIG. 2B is a partial cross-sectional view showing a schematic configuration of the polarization element.

In FIG. 1, the reference symbol P1 denotes the pitch of the thin metal wires, the reference symbol P2 denotes the pitch of protruding sections, the reference symbol H1 denotes the height of each of the thin metal wires, and in FIG. 2B the reference symbols H2, H3, and H4 denote the heights of the protruding sections. Further, it is assumed that an extending direction of the thin metal wires is the Y-axis direction, and the arranging axis of the thin metal wires is the X-axis direction.

As shown in FIGS. 1 and 2B, the polarization element 1 has a structure of absorbing the unwanted polarized light using a surface plasmon resonance (SPR). The polarization element 1 has a configuration having a plurality of grid sections 14 arranged on a substrate 10. It should be noted that details of the SPR will be described later.

As the constituent material of the substrate 10, the material having a light transmissive property and high heat resistance such as glass or quartz is used. In the present embodiment, a glass substrate is used as the substrate 10.

The plurality of grid sections 14 is arranged in a direction (the X-axis direction) parallel to the plane of the substrate 10 at a pitch P1 shorter than the wavelength of the light, and forms a striped shape (a plan-view striped shape) in which the extending directions of the respective grid sections are parallel to each other when viewed from a direction (the Z-axis direction) perpendicular to the plane of the substrate 10.

The grid sections 14 are each composed of a thin metal wire 11 formed on the substrate 10, and a plurality of protruding sections 12 and recessed sections 13 formed on the thin metal wire 11, and the protruding sections 12 and the recessed sections 13 are arranged at intervals in the longitudinal direction of the thin metal wire 11.

The thin metal wires 11 are formed to have a dimension in the longitudinal direction (the Y-axis direction) sufficiently longer than the wavelength of the light. The thin metal wires 11, the protruding sections 12, and the recessed sections 13 each have a rectangular shape viewed from at least the X-axis direction.

As the constituent material of the grid sections 14 (the thin metal wires 11 and the protruding sections 12), aluminum (Al), gold (Au), silver (Ag), copper (Cu), molybdenum (Mo), and chromium (Cr), and alloys of any of these metals, for example, can be used. In the present embodiment, Al is used as the constituent material of both of the thin metal wires 11 and the protruding sections 12.

As described above, by using glass as the constituent material of the substrate 10, and Al as the constituent material of the thin metal wires 11 and the protruding section 12, the heat resistance of the polarization element 1 as a whole can be improved.

The grid sections 14 are set to have the pitch P1 of about 140 nm, and the height H1 of about 175 nm, for example. The height H1 of the grid sections 14 denotes the distance from the upper surface 10a of the substrate 10 to the upper surface 12a of each of the protruding sections 12. The pitch P1 of the thin metal wires 11 is equal to the sum of the width W1 of the thin metal wire 11 in the X-axis direction and the width W2 of a space between the thin metal wires 11 adjacent to each other.

Further, the ratio between the width W1 of the thin metal wire 11 in the X-axis direction and the width W2 of the space between the thin metal wires 11 is set to approximately 1:1.

Further, the proportion of the protruding sections 12 to the pitch of each of the grid sections 14, namely the proportion D (the ratio D=L1/P2) of the length L1 of the protruding section 12 to the arrangement pitch P2 of the protruding sections 12 in each of the grid sections 14 is a constant value of 0.5.

A plurality of protruding sections 12 and a plurality of recessed sections 13 are arranged on the upper surface 11a of the thin metal wire 11 along the longitudinal direction (the Y-axis direction) of the thin metal wire 11 at a predetermined pitch shorter than the wavelength of the light. Here, the length L1 of each of the protruding sections 12 formed on the thin metal wire 11 and the length L2 of each of the recessed sections 13 formed on the same thin metal wire 11 are equal to each other, and the arrangement pitch P2 of the protruding sections 12 (the recessed sections 13) formed on the thin metal wire 11 of each of the grid sections 14 in the longitudinal direction (the Y-axis direction) of the thin metal wire 11 is set to 500 nm.

It should be noted that the pitches P2 is a sum of the length L1 of the protruding section 12 formed on each of the thin metal wires 11 in the Y-axis direction and the length L2 of the recessed section 13 between the protruding sections 12 adjacent to each other.

As shown in FIGS. 2A and 2B, the protruding sections 12 and the recessed sections 13 are formed to have rectangular side-view shapes and rectangular plan view shapes, and have a predetermined height and a predetermined depth, respectively. As shown in FIG. 2B, in the grid sections 14 according to the present embodiment, the height (the depth of the recessed sections 13) of the protruding sections 12 is not constant but different between the grid sections 14 adjacent to each other.

Specifically, the height H2 (the depth of the recessed sections 13A) of the protruding sections 12A arranged on the grid sections 14A (first grid sections) is 25 nm, the height H3 of the protruding sections 12B arranged on the grid sections 14B (second grid sections) is 50 nm, and the height H4 of the protruding sections 12C arranged on the grid sections 14C is 75 nm. It should be noted that since the height H1 of each of the grid sections 14 is set to be constant, the heights H2', H3', and H4' of the thin metal wires 11A, 11B, and 11C are also different from each other in accordance with the heights H2, H3, and H4 of the respective protruding sections 12A, 12B, and 12C, and H2'>H3'>H4' is satisfied.

As shown in FIGS. 2A and 2B, in the present embodiment, a grid group G1 is composed of the three grid sections 14A, 14B, and 14C different in the height of the protruding sections 12 from each other. The width W3 (the distance between the widthwise outer end portions of the respective grid sections 14A, 14C disposed on both sides of the grid section 14B so as to sandwich the grid section 14B) of the grid group G1 in the arrangement direction of the grid sections 14A, 14B, and 14C is set to be smaller than the wavelength of the incident light.

The polarization element 1 according to the present embodiment is configured by disposing a plurality of such grid groups G1 on the substrate 10. The interval between the grid groups G1 is equal to the width W2 (FIG. 1) of the space between the thin metal wires 11.

By setting the height of the grid, sections 14 to and making the heights H2, H3, and H4 (the depths of the recessed sections 13A, 13B, and 13C) of the protruding sections 12A, 12B, and 12C in the grid sections 14 adjacent to each other different from each other as described above, the element structure for developing the SPR can be obtained.

Although in the present embodiment the grid section 14A, the grid section 14B, and the grid section 14C are arranged in the Y-axis direction in this order, in the ascending order of the height of the protruding sections 12, it is not necessary to arrange them in the order of the height of the protruding sections 12 providing the heights of the protruding sections 12 and the recessed sections 13 are different between the grid sections 14 adjacent to each other.

Figure 3:
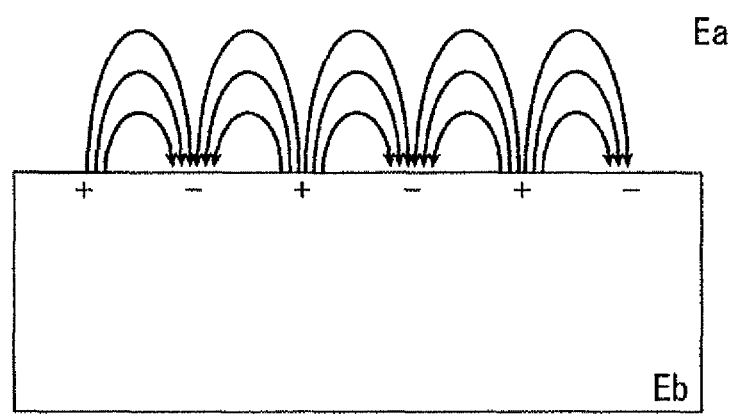
FIG. 3 is a diagram showing a mechanism of the electrical field enhancement by the SPR.

Here, the SPR will be explained with reference to FIG. 3. FIG. 3 is a diagram showing a mechanism of the electrical field enhancement by the SPR. As shown in FIG. 3, the interface between the metal (with a dielectric constant Eb) and the dielectric material (with a dielectric constant Ea) such as air is considered.

Free electrons exist in the metal, and when the light enters the surface of the metal from the side of the dielectric material, a compressional wave (a surface plasmon) of the free electrons can be excited in a certain condition. In this condition, the energy of the light entering the surface of the metal is consumed for the excitation of the surface plasmon. As a result, the energy of the light reflected by the surface of the metal is reduced.

When making the light propagating through air enter a flat metal surface, no surface plasmon can be excited. This is because, in either of the incident angles, the wave number in the interface direction the incident light has becomes equal to or smaller than the wave number of the surface plasmon, but is not equal thereto. There is known a method of using a diffraction grating on a metal surface in order for exciting the surface plasmon. This is because, specifically, when making the light enter the diffraction grating, the wave number of the evanescent wave generated is obtained by adding the wave number of the diffraction grating to the wave number of the incident light, and therefore, can be made equal to or larger than the wave number of the surface plasmon. It should be noted that the surface plasmon is a compressional wave of the electrons in the interface direction. Therefore, only the light component with the polarization perpendicular to the diffraction grating can excite the surface plasmon.

Figure 4A:
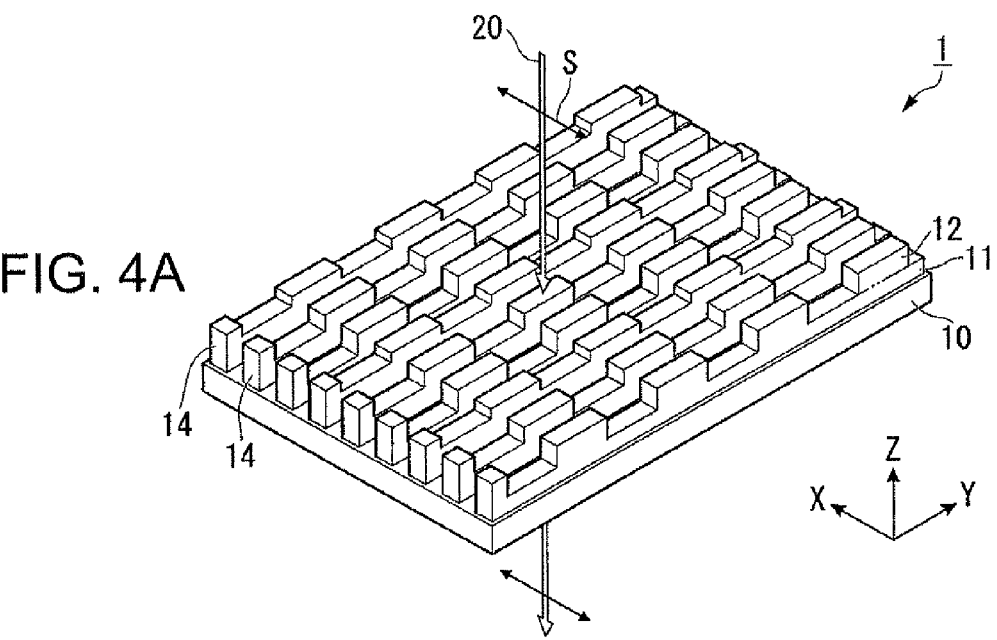
FIGS. 4A and 4B are schematic diagrams showing polarization separation of the light entering the polarization element.
Figure 4B:
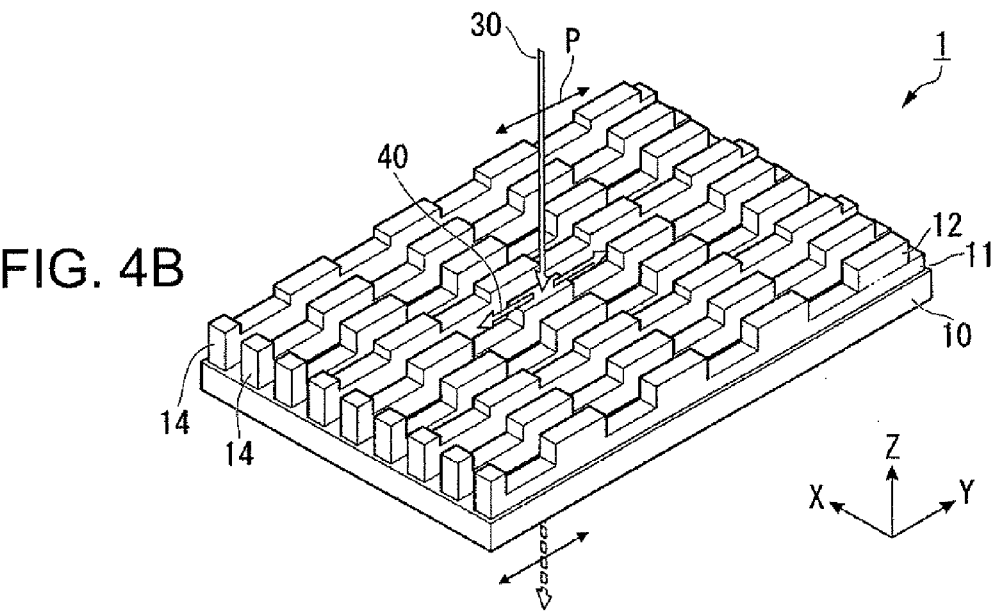
Figure 5A:
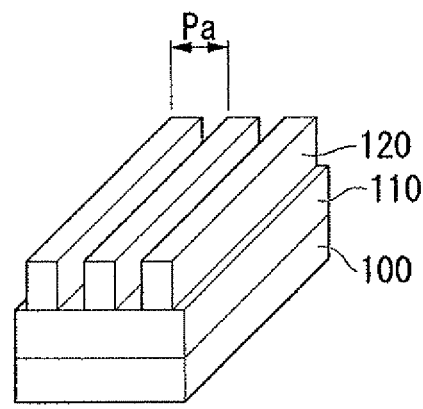
FIGS. 5A through 5E are diagrams showing a manufacturing process of the polarization element according to the first embodiment of the invention.
Figure 5B:
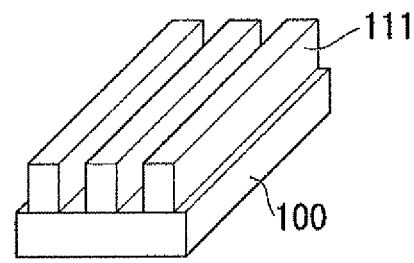
Figure 5C:
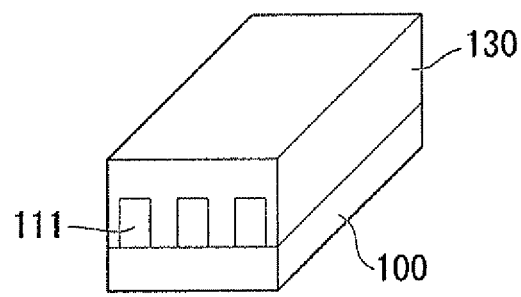
Figure 5D:
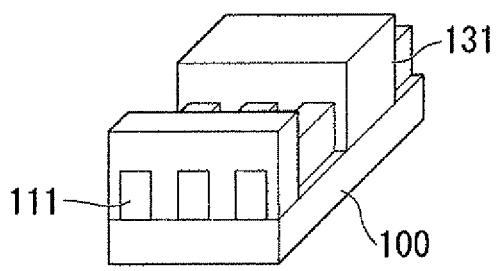
Figure 5E:
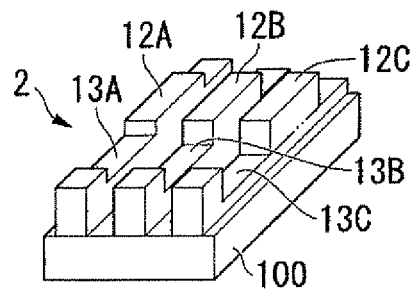

FIGS. 4A and 4B are schematic diagrams showing polarization separation of the light entering the polarization element 1. FIG. 4A shows the case in which the linearly polarized light TM (transverse magnetic) vibrating in a direction perpendicular to the longitudinal direction of the thin metal wires 11 enters the polarization element 1. FIG. 4B shows the case in which the linearly polarized light TE (transverse electric) vibrating in the longitudinal direction of the thin metal wires 11 enters the polarization element 1.

As shown in FIG. 4A, the incident light 20 to the polarization element 1 has a component "s" (a TM polarization component) having a polarization axis perpendicular to the longitudinal direction (the Y-axis direction) of each of the thin metal wires 11. Therefore, the polarization axis "s" of the incident light 20 becomes parallel to a resonant grating. Specifically, the polarization axis "s" of the incident light 20 becomes parallel to the arrangement direction (the X-axis direction) of the grid sections 14. Therefore, according to the principle described above, the evanescent wave is not generated, and no surface plasmon can be excited.

Therefore, in the case in which the linearly polarized light TM enters the polarization element 1, the surface plasmon resonance does not develop. In other words, the polarization element 1 performs only the polarization separation function on the incident light 20. Therefore, as a result, the most part of the incident light 20 is transmitted through the polarization element 1.

As shown in FIG. 4B, the incident light 30 to the polarization element 1 has a component "p" (a TE polarization component) having a polarization axis parallel to the longitudinal direction (the Y-axis direction) of each of the thin metal wires 11. Therefore, the polarization axis "p" of the incident light 30 becomes perpendicular to the resonant grating. Specifically, the polarization axis "p" of the incident light 30 becomes perpendicular to the arrangement direction (the X-axis direction) of the grid sections 14. Therefore, according to the principle described above, the surface plasmon 40 can be excited.

Therefore, in the case in which the linearly polarized light TE enters the polarization element 1, the surface plasmon resonance develops. Therefore, the energy of the incident light 30 is consumed for the excitation of the surface plasmon 40. Although under ordinary circumstances the polarization separation function is performed on the incident light 30 having the polarization axis "p" to reflect the most of the incident light 30, the energy of the incident light 30 is consumed for the excitation of the surface plasmon 40 in the structure according to the invention. Thus, as a result, the reflected light is reduced. In other words, by developing the surface plasmon resonance (SPR), the linearly polarized light TE entering the polarization element 1 can selectively be absorbed.

As described above, in the present embodiment of the invention, the structure of developing the SPR is obtained by forming the thin metal wires 11 on the upper surface of the substrate 10, forming the protruding sections 12 on the upper surface 11a of each of the thin metal wires 11 in the longitudinal direction of the thin metal wire 11 at the pitch P2 shorter than the wavelength of the light while making the arrangement pitches P2 of the protruding sections 12 and the proportion D of the protruding section 12 the same between the grid sections 14, and making the heights of the grid sections 14 adjacent to each other different from each other. Thus, it becomes possible to selectively absorb the linearly polarized light TE (unwanted polarized light) without providing the absorbing layer as provided in the case of Document 1. Further, since the wavelength of the linearly polarized light TE, which can be absorbed, can be made different between the grid sections 14, the wavelength range of the linearly polarized light, which can be absorbed, can dramatically be expanded, as a result. Therefore, the reflectance can be reduced in a broad wavelength range.

FIGS. 5A through 5E are diagrams showing a manufacturing process of the polarization element. Firstly, an Al film 110 is formed on the glass substrate 100 by a method such as evaporation or sputtering. Subsequently, photoresist is applied on the Al film 110 by a method such as spin-coating, and a resist pattern 120 is formed (see FIG. 5A) by a method such as two-beam interference exposure. On this occasion, the resist pattern 120 is formed so as to have a pitch Pa (corresponding to the pitch of the thin metal wires) of about 140 nm. It should be noted that the method of forming the resist pattern 120 is not limited thereto. A transfer process such as nanoimprint can also be used.

Subsequently, using the resist pattern 120 as a mask, reactive ion etching (RIE) with a chlorine-based gas is performed. Thus, anisotropic etching is performed on the Al film 110 until the upper surface of the glass substrate 100 is exposed. Subsequently, the resist pattern 120 is removed, thereby forming (see FIG. 5B) the thin metal wires 111.

Subsequently, photoresist 130 is applied (see FIG. 5C) to the surface of the glass substrate 100 provided with the thin metal wires 111 by a method such as spin-coating. Subsequently, a resist pattern 131 with the pitch P2 (the pitch of the protruding sections) of about 500 nm is formed (see FIG. 5D) by a method such as a photoresist method.

Subsequently, while using the resist pattern 131 as a mask, etching (RIE) is performed selectively on the areas where the thin metal wires 111 are exposed. The etching amount of the thin metal wires 111 is controlled by the etching time, and the etching amount is selectively varied between the thin metal wires 111 adjacent to each other. Subsequently, by removing the resist pattern 131, the protruding sections 12A, 12B, and 12C are formed at the portions having been covered by the resist pattern 131 while the recessed sections 13A, 13B, and 13C are formed at the portions on which the etching is performed (see FIG. 5E). The polarization element 1 according to the present embodiment of the invention can be manufactured by the process described hereinabove.

According to the polarization element 1 of the present embodiment of the invention, by adopting the resonant grating structure in which the protruding sections 12 and the recessed sections 13 are arranged on the upper surface 11a of each of the thin metal wires 11 at the pitch P2 shorter than the wavelength of the incident light, and the height (the depth of the recessed sections 13) of the protruding sections 12 in the longitudinal direction of the thin metal wires 11 is different between the grid sections 14 adjacent to each other, it becomes possible to develop the surface plasmon resonance (SPR) to thereby selectively absorb the linearly polarized light TE (the unwanted polarized light) with a predetermined wavelength entering the polarization element 1, and at the same time expand the range of the wavelength of the polarized light which can be absorbed.

Figure 6:
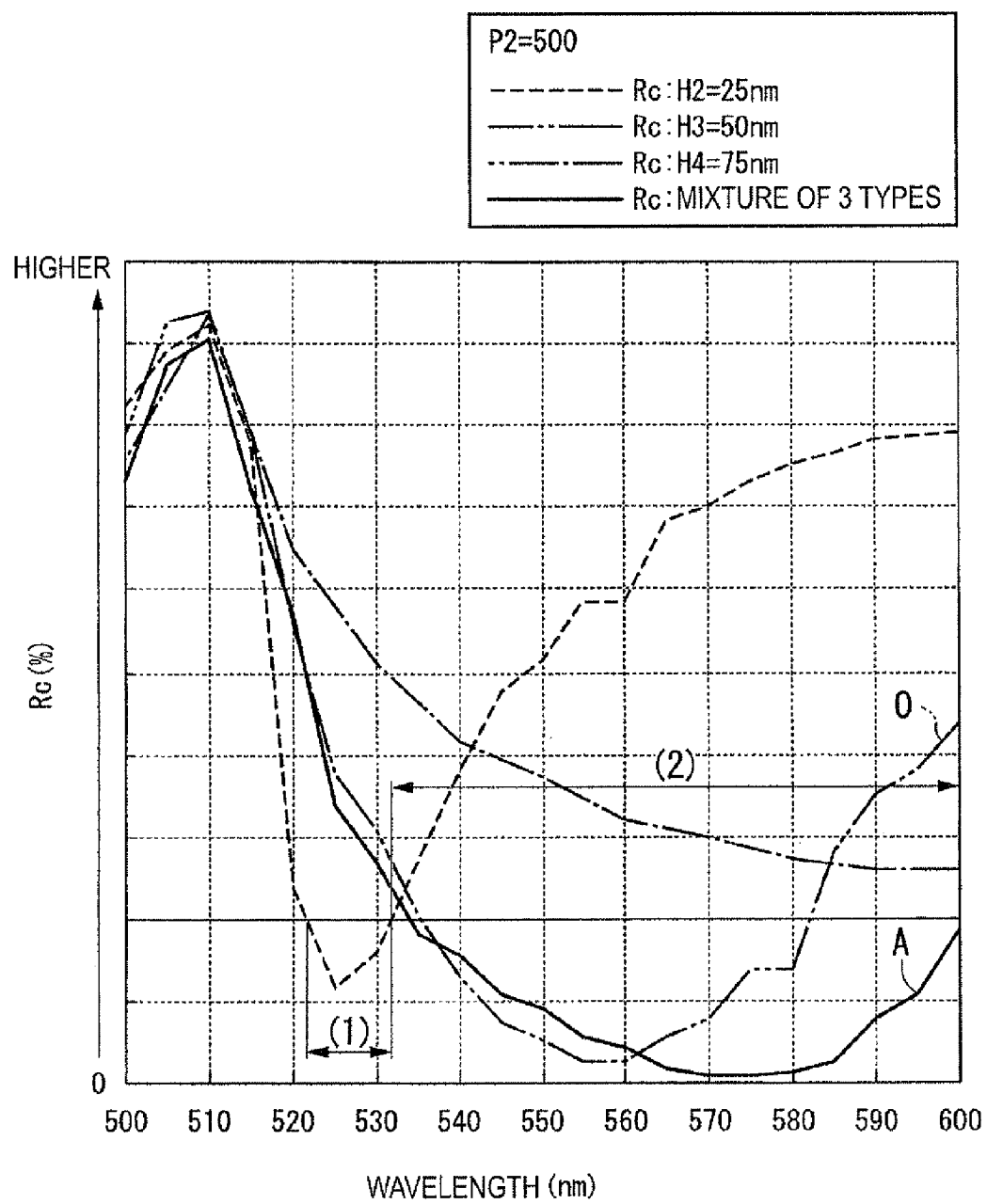
FIG. 6 is a graph showing the reflection characteristic of the first embodiment.

Specifically, the reflectance curve of the polarization element 1 according to the present embodiment becomes to have the shape schematically shown in FIG. 6. FIG. 6 shows the reflection characteristic of the polarization element according to the present embodiment. In the drawing, the lateral axis represents the wavelength of the incident light, and the vertical axis represents the reflectance (Rc) with respect to the TE light.

FIG. 6 shows the reflection characteristics in the respective three types of resonant gratings having the arrangement pitch P2 of the protruding sections of 500 nm, and the heights (the height H2 of 25 nm, the height H3 of 50 nm, and the height H4 of 75 nm) of the protruding sections different from each other.

In each of the resonant gratings with respective heights H2 through H4 of the protruding sections different from each other, a significant decrease in reflectance is observed in the reflectance (Rc) to the TE light around a predetermined wavelength. It is conceivable that this decrease in the reflectance is caused by the consumption of the energy of the incident light for the excitation of the surface plasmon.

Further, according to FIG. 6, it is understood that the wavelength band in which the reflectance (Rc) with respect to the TE light becomes lower than a reference value (indicated by the dashed line) is different between the heights of the protruding sections. In other words, the band of the resonant wavelength varies in accordance with the height of the protruding sections.

Taking the curve O of the reflection characteristic in the resonant grating having the height of the protruding sections of H3 (=50 nm) and the arrangement pitch P2 of the protruding sections of 500 nm as a reference, the band of the resonant wavelength is shifted toward the shorter wavelength side if the height of the protruding sections decreases to H2 (=25 nm), while the band of the resonant wavelength is shifted toward the longer wavelength side if the height of the protruding sections increases to H4 (=75 nm).

Therefore, the polarization element having the three grid sections, which have the protruding sections made to have the heights different from each other, mixed with each other becomes to have the reflection characteristic indicated by the solid line A shown in FIG. 6, and is capable of absorbing the reflected light with the wavelength included in the broader range of frequency band (2) from shorter wavelengths to longer wavelengths compared to the reflection wavelength band (1) of the polarization element provided with the grid sections having a single height of the protruding sections.

Thus, it is conceivable that the resonant wavelength varies in accordance with the height of the protruding sections of the resonant grating.

When the linearly polarized light TE enters the resonant grating structure according to the present embodiment described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced.

Further, since in the present embodiment the arrangement pitch P2 of the protruding sections 12 and the proportion (the proportion D=L1/P2) of the length L1 of the protruding section 12 to the arrangement pitch P2 of the protruding sections 12 are the same between the grid sections, and the height of the protruding sections 12 is different between the grid sections 14 adjacent to each other, the wavelength of the linearly polarized light TE which can be absorbed is different between the grid sections 14, and as a result, the wavelength range of the linearly polarized light which can be absorbed can dramatically be expanded. Therefore, since the reflectance can be decreased in a broad wavelength range, the design margin thereof increases when applying the polarization element to the projectors and so on, and the polarization element 1 can be obtained as a more user-friendly polarization element.

Therefore, it becomes possible to provide the polarization element 1 capable of selectively absorbing unwanted polarized light to thereby be superior in grayscale expression, and realize high-quality image display. Further, since it is not required to provide the absorbing layer, which is provided in the case of Document 1, it becomes possible to simplify the element structure to thereby achieve cost reduction.

Further, according to this configuration, the thin metal wires 11 and the protruding sections 12 each have a rectangular side-view shape, and are therefore easy to manufacture. Specifically, these constituents can easily be manufactured by forming the metal film on the substrate, and then performing anisotropic etching of the RIE thereon using the resist pattern as a mask. Therefore, it becomes possible to improve the production efficiency to thereby achieve the cost reduction.

Further, since in the present embodiment, the height of the protruding sections 12 formed on the thin metal wire 11 is different between the grid sections 14 adjacent to each other, the wavelength of the linearly polarized light TE which can be absorbed is different between the grid sections 14, and as a result, the wavelength range of the linearly polarized light which can be absorbed is dramatically expanded. Therefore, since the reflectance can be decreased in a broad wavelength range, the design margin thereof increases when applying the polarization element 1 to the projector described later, and the polarization element 1 can be made more user-friendly.

Further, by forming the three types of grid sections 14 having the respective heights of the protruding sections 12 different from each other as a group, and arranging it as the grid group G1 as shown in FIGS. 1, 2A, and 2B, the element design becomes easy, and at the same time, manufacturing thereof becomes easy. It should be noted that it is also possible to form two types of grid sections 14 different in the height of the protruding sections 12 as a group, or to form four or more types of grid sections 14 different in the height of the protruding sections 12 as a group.

Further, although in the present embodiment the example of arranging the protruding sections 12 and the recessed sections 13 on the upper surface 11a of each of the thin metal wires 11 is shown, the invention is not limited thereto. For example, the protruding sections 12 and the recessed sections 13 can also be arranged on at least one surface of each of the thin metal wires 11 such as a side surface of each of the thin metal wires 11. Even in such a configuration, the surface plasmon can be excited.

Further, although in the present embodiment the grid sections 14 are arranged in the order of the height of the protruding sections 12, it is not necessary to arrange them in the order of the height of the protruding sections 12 providing the height of the protruding sections 12 is different between the grid sections 14 adjacent to each other. For example, it is also possible that a plurality of types of grid sections 14 with the respective heights of the protruding sections 12 different from each other are arranged irregularly on the substrate 10.

Further, although in the present embodiment there is described the structure in which the ratio between the width W1 of each of the grid sections 14 (the thin metal wires 11) and the width W2 of the space between the grid sections 14 (the thin metal wires 11) is set to approximately 1:1, the invention is not limited thereto. For example, the ratio between the width W1 of each of the grid sections 14 (the thin metal wires 11) and the width W2 of the space between the grid sections 14 (the thin metal wires 11) can also be set to be different from each other.

Polarization Element of Second Embodiment

Figure 7A:
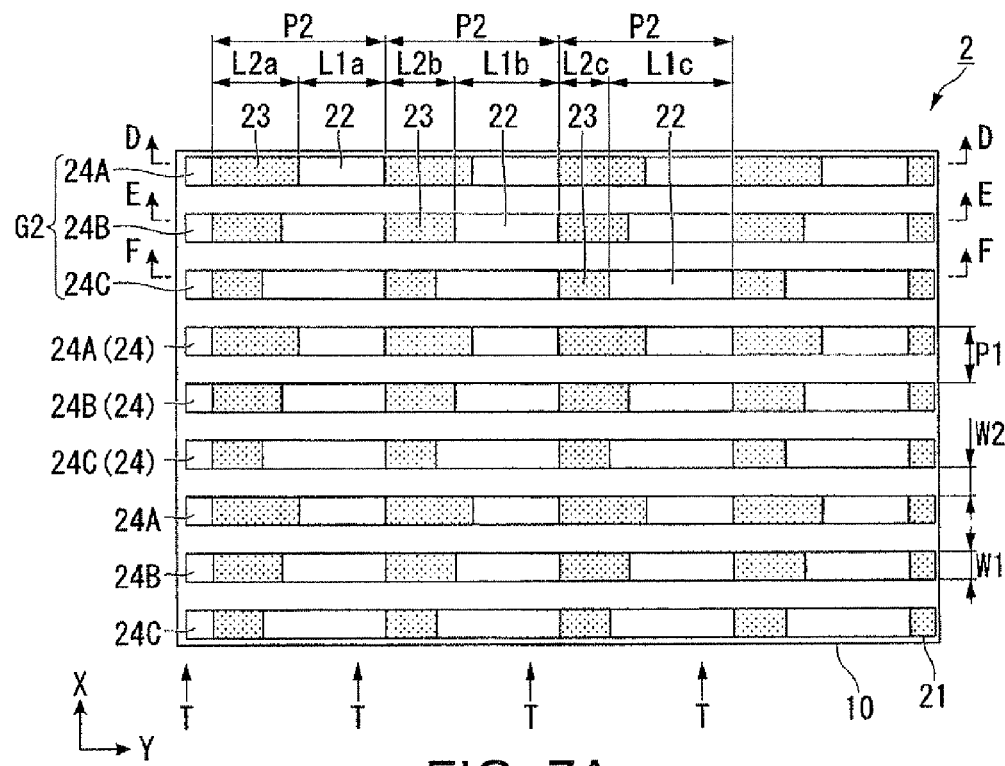
FIG. 7A is a plan view showing a schematic configuration of a polarization element according to a second embodiment.
Figure 7B:
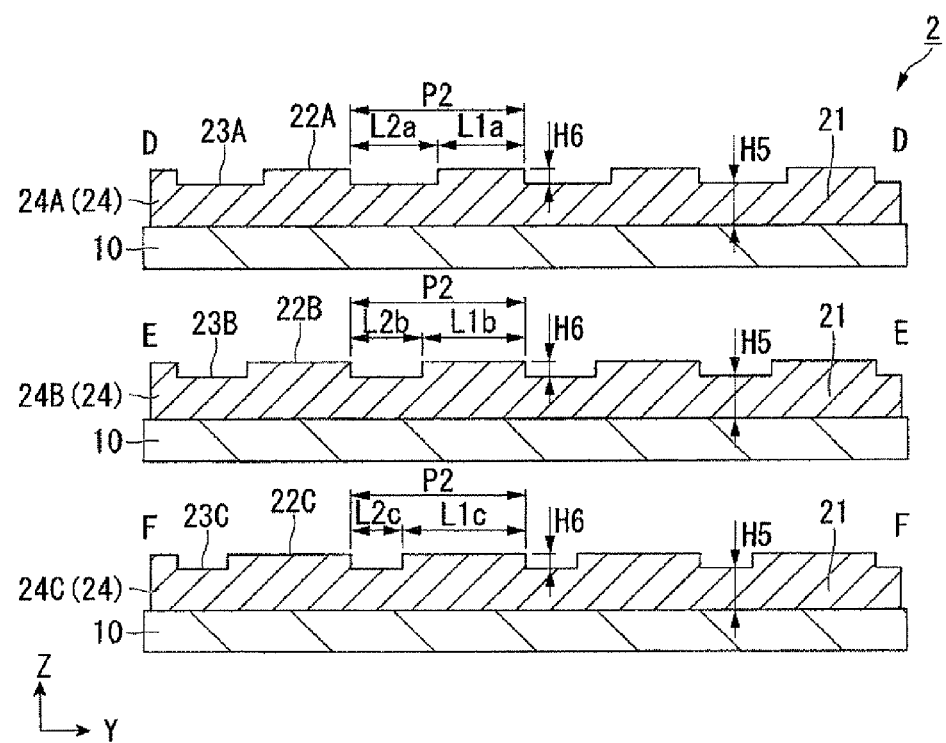
FIG. 7B is a partial cross-sectional view showing a schematic configuration of the polarization element according to the second embodiment.

Then, the polarization element according to a second embodiment will be described. FIG. 7A is a plan view showing a schematic configuration of the polarization element according to the second embodiment, and FIG. 7B is a partial cross-sectional view showing a schematic configuration of the polarization element according to the second embodiment.

Although in the embodiment described above there is described the configuration in which the height of the protruding sections is different between the grid sections adjacent to each other, in the present embodiment there is adopted a configuration in which the heights of the protruding sections of the respective grid sections are set to be equal to each other, and the proportion of the protruding sections is different between the grid sections adjacent to each other.

As shown in FIG. 7A, the polarization element 2 according to the present embodiment is composed of the substrate 10, and a plurality of grid sections 24 arranged on the substrate 10 in a striped manner, and the plurality of grid sections 24 is arranged at a pitch P1 shorter than the wavelength of the incident light.

The arrangement pitch P1 of the grid sections 24 in the X-axis direction is 140 nm, and the ratio between the width W1 of the grid sections 24 (thin metal wires 21) and the width W2 of the space between the grid sections 24 (the thin metal wires 21) is set to approximately 1:1 similarly to the embodiment described above.

Each of the grid sections 24 is composed of the thin metal wire 21, and a plurality of protruding sections 22 and a plurality of recessed sections 23 arranged on the thin metal wire 21. The height H5 (the distance from the upper surface 10a of the substrate 10 to the upper surface 21a of the thin metal wire 21) of the thin metal wire 21 is set to 150 nm, and the height H6 of the protruding sections 22 arranged on the thin metal wire 21 is set to 25 nm, which are the same between the grid sections 24.

In the present embodiment, the proportion D of the protruding sections provided to the grid section 24 is different between the grid sections 24 adjacent to each other. Specifically, there are provided grid groups G2 each composed of three grid sections 24A, 24B, and 24C different from each other in the proportion D of the protruding sections provided to the grid section 24. Out of the three grid sections 24, the proportion D of the protruding sections in the grid section 24A is set to 0.5, the proportion D of the protruding sections in the grid section 24B is set to 0.6, and the proportion D of the protruding sections in the grid section 24C is set to 0.7.

The polarization element 2 according to the present embodiment is configured by disposing a plurality of such grid groups G2 on the substrate 10. The interval between the grid groups G2 is equal to the width W2 of the space between the thin metal wires 21.

Further, the pitch P2 of the protruding sections 22 in each of the grid sections 24 is set to 500 nm.

In the present embodiment, the length of the protruding section 22 is different between the grid sections 24 adjacent to each other. Assuming that the lengths of the protruding sections 22A, 22B, and 22C of the grid sections 24A, 24B, and 24C are L1$a$, L1$b$, and L1$c$, respectively, there is a relationship of L1$a$<L1$b$<L1$c$ between them. In contrast, assuming that the lengths of the recessed sections 23A, 23B, and 23C of the grid sections 24A, 24B, and 24C are L2$a$, L2$b$, and L2$c$, respectively, there is a relationship of L2$a$>L2$b$>L2$c$ between them.

One ends (one ends of the protruding sections 22 in the longitudinal direction thereof) of the protruding sections 22 in the respective grid sections 24 are aligned at a position indicated by the arrow T in FIG. 7A viewed from the arrangement direction (the X-axis direction) of the grid sections 24.

It should be noted that although in the present embodiment the grid sections 24A, 24B, and 24C are arranged in the order of the lengths of the protruding sections 22A, 22B, and 22C, the invention is not limited thereto, but it is sufficient that the proportion D of the protruding sections is different between the grid sections 24 adjacent to each other.

It should be noted that although in the present embodiment the grid group G2 is composed of three grid sections 24 different from each other in the proportion D of the protruding sections, it is also possible to configure the grid group with the two grid sections 24 different from each other in the proportion D of the protruding sections, or to configure the grid group G2 with the four or more grid sections 24 different from each other in the proportion D of the protruding sections.

According to the configuration described above, there is provided the configuration in which the proportion D of the protruding sections is different between the grid sections 24 adjacent to each other. By making the proportions D of the protruding sections in the grid sections 24 adjacent to each other vary in accordance with the wavelength of the incident light, the surface plasmon resonance (SPR) is developed, thereby making it possible to selectively absorb the linearly polarized light TE (the unwanted polarized light) with a specific wavelength entering the polarization element 2, and at the same time, to expand the range of the wavelength of the polarized light which can be absorbed.

Figure 8:
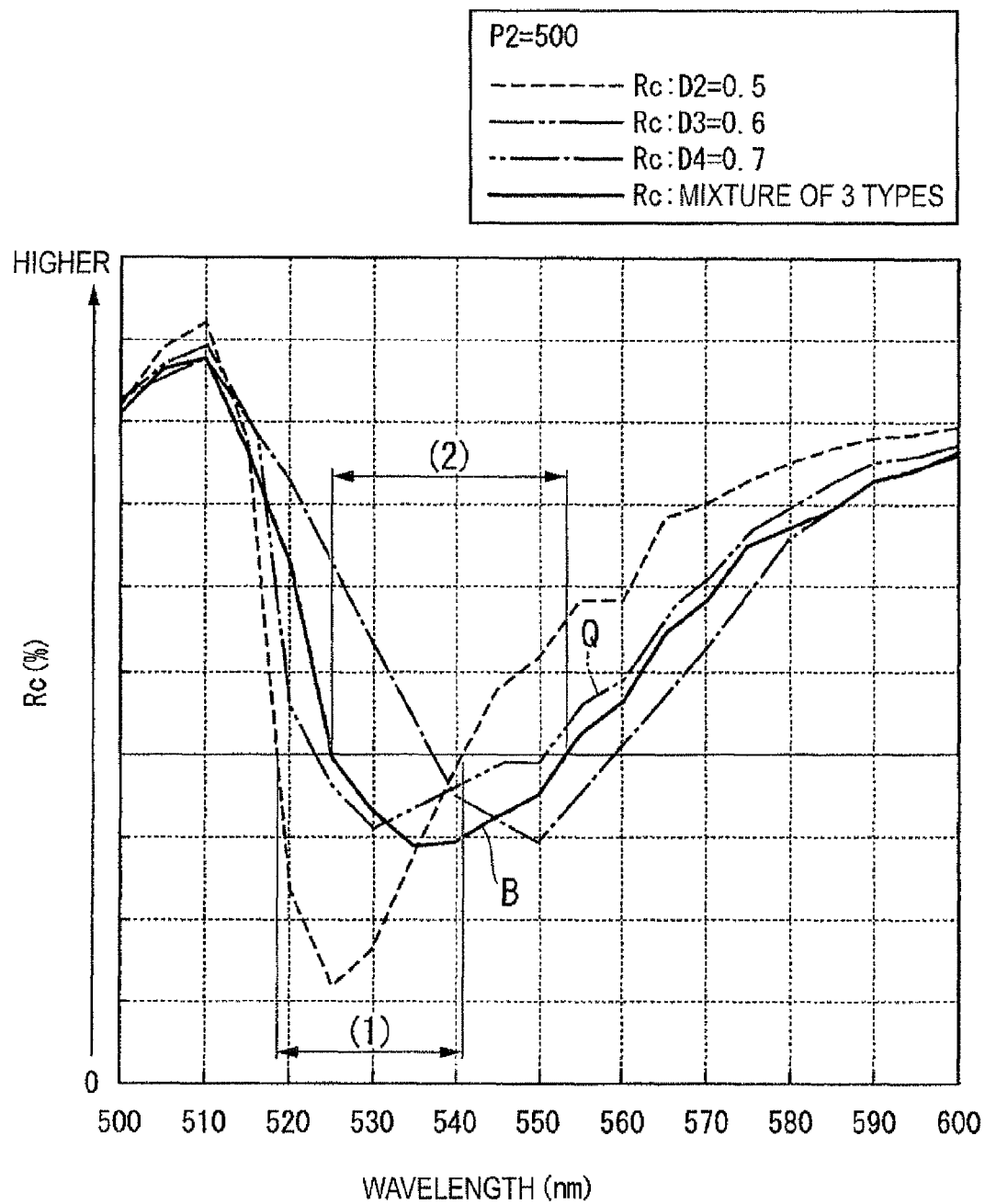
FIG. 8 is a graph showing the reflection characteristic of the second embodiment.

Specifically, the reflectance curve of the polarization element 2 according to the present embodiment becomes to have the shape schematically shown in FIG. 8. FIG. 8 shows the reflection characteristic of the polarization element according to the present embodiment. In the drawing, the lateral axis represents the wavelength of the incident light, and the vertical axis represents the reflectance (Rc) with respect to the TE light.

FIG. 8 shows the reflection characteristics in the respective three types of resonant gratings having the arrangement pitch P2 of the protruding sections of 500 nm, and the proportions of the protruding sections in the respective grid sections (the proportion D2 in the first grid section of 0.5, the proportion D3 in the second grid section of 0.6, and the proportion. D4 in the third grid section of 0.7) different from each other.

According to FIG. 8, it is understood that the wavelength band in which the reflectance (Rc) with respect to the TE light decreases most significantly is different between the proportions of the protruding sections also in the present embodiment. In other words, the band of the resonant wavelength varies in accordance with the proportion of the protruding sections.

Taking the curve Q of the reflection characteristic in the resonant grating having the arrangement pitch P2 of the protruding sections of 500 nm, and the proportion D of the protruding sections of D3 (=0.6) as a reference, the band of the resonant wavelength is shifted toward shorter wavelengths if the proportion D becomes D2 (=0.5) while the band of the resonant wavelength is shifted toward longer wavelengths if the proportion D becomes D4 (=0.7).

Therefore, the polarization element having the three grid sections, which have the proportions of the protruding sections different from each other, mixed with each other becomes to have the reflection characteristic indicated by the solid line B shown in FIG. 8, and is capable of absorbing the reflected light with the frequency included in the broader range of wavelength band (2) from shorter wavelengths to longer wavelengths compared to the reflection wavelength band (1) of the polarization element provided with the grid sections having a single proportion of the protruding sections.

Thus, it is conceivable that the resonant frequency varies in accordance with the proportion of the protruding sections of the resonant grating.

Polarization Element of Third Embodiment

Figure 9A:
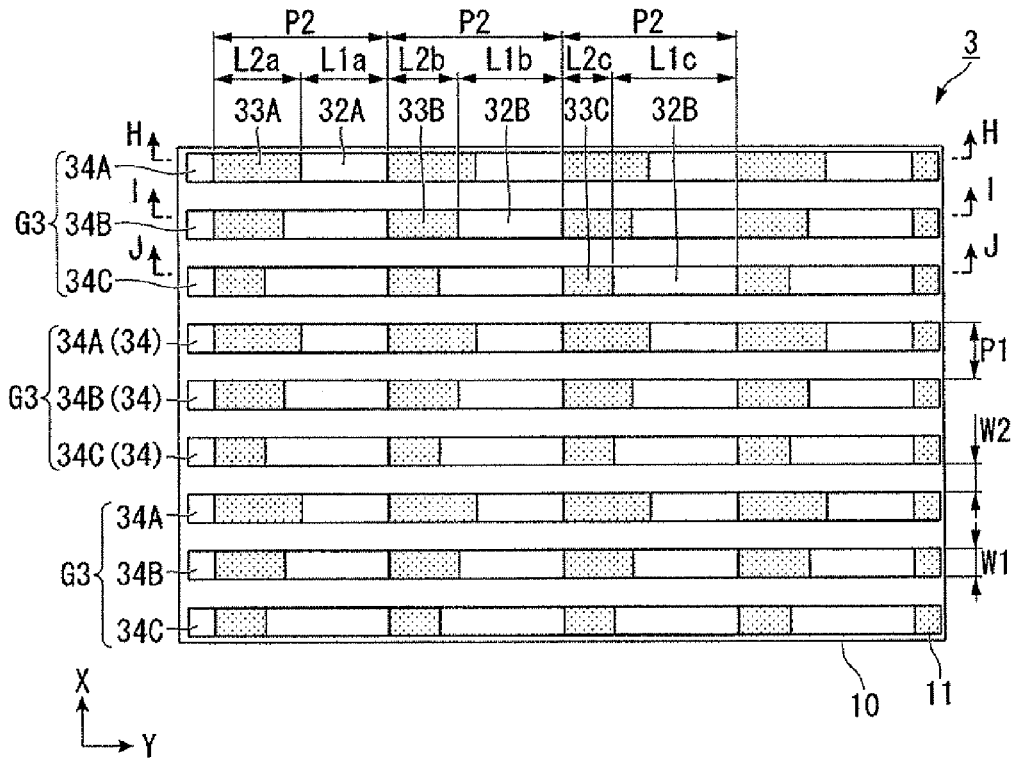
FIG. 9A is a plan view showing a schematic configuration of a polarization element according to a third embodiment.
Figure 9B:
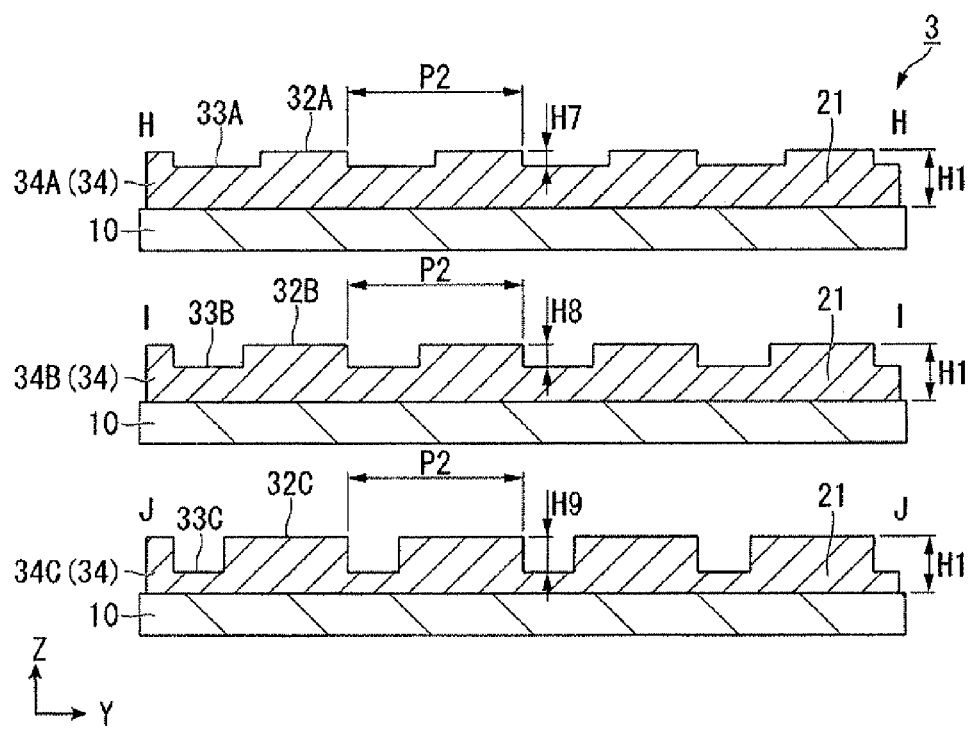
FIG. 9B is a partial cross-sectional view showing a schematic configuration of the polarization element according to the third embodiment.

Then, the polarization element according to a third embodiment will be described. FIG. 9A is a plan view showing a schematic configuration of the polarization element according to the third embodiment, and FIG. 9B is a partial cross-sectional view showing a schematic configuration of the polarization element according to the third embodiment.

Although in the embodiment described above there is described the configuration in which the proportion D of the protruding sections is different between the grid sections adjacent to each other, in the present embodiment there is adopted a configuration in which not only the proportion D of the protruding sections but also the height of the protruding sections are different between the grid sections adjacent to each other.

The fundamental configuration of the polarization element 3 according to the present embodiment is substantially the same as that of the second embodiment, and therefore, the explanation therefor will be omitted if appropriate, and the configuration different therefrom will mainly be explained.

As shown in FIG. 9A, the polarization element 3 according to the present embodiment has a plurality of grid sections 34 disposed on the substrate 10 so as to be arranged at a pitch shorter than the wavelength of the incident light in a striped manner.

Conditions of the constituents will be described below.

The arrangement pitch P1 of the grid sections 34 in the X-axis direction: 140 nm (The width W1 of the grid section 34 (the thin metal wire 11))=(the width W2 of the space between the grid sections 34 (the thin metal wires 11))

The arrangement pitch P2 of the protruding sections 32 of each of the grid sections 34: 500 nm The height H1 of the grid sections 34: 175 nm As shown in FIGS. 9A and 9B, in the present embodiment both of the proportion D and the height of the protruding sections 32 are different between the grid sections 34 adjacent to each other.

Table 1 shows the proportions D and the heights of the protruding sections 32A, 32B, and 32C of the respective grid sections 34A, 34B, and 34C.

TABLE 1

| | PROPORTION OF PROTRUDING SECTIONS | HEIGHT OF PROTRUDING SECTIONS [nm] |
|---|---|---|
| 34A | 0.5 | 25 |
| 34B | 0.6 | 50 |
| 34C | 0.7 | 75 |

As shown in Table 1, in the three grid sections 34 constituting the grid group G3, it is arranged that the proportion D2 (a first proportion) of the protruding sections 32A of the grid section 34A (a first grid section) is 0.5, the proportion D3 (a second proportion) of the protruding sections 32B of the grid section 34B (a second grid section) is 0.6, and the proportion D4 (a third proportion) of the protruding sections 32C of the grid section 34C (a third grid section) is 0.7.

Further, it is arranged that the height H7 of the protruding sections 32A of the grid section 34A is 25 nm, the height H8 of the protruding sections 32B of the grid section 34B is 50 nm, and the height H9 of the protruding sections 32C of the grid section 34C is 75 nm.

It should be noted that in the grid sections 34A, 34B, and 34C, the lengths L1$a$, L1$b$, and L1$c$ of the respective protruding sections 32A, 32B, and 32C have a relationship of L1$a$<L1$b$<L1$c$, while the lengths L2$a$, L2$b$, and L2$c$ of the respective recessed sections 33A, 33B, and 33C have a relationship of L2$a$>L2$b$>L2$c$.

By adopting the configuration of making the proportions D and the heights H of the protruding sections in the grid sections 34 adjacent to each other different from each other, the surface plasmon resonance (SPR) is developed, thereby making it possible to selectively absorb the linearly polarized light TE (the unwanted polarized light) with a specific wavelength entering the polarization element 3, and at the same time, to expand the range of the wavelength of the polarized light which can be absorbed.

Figure 10:
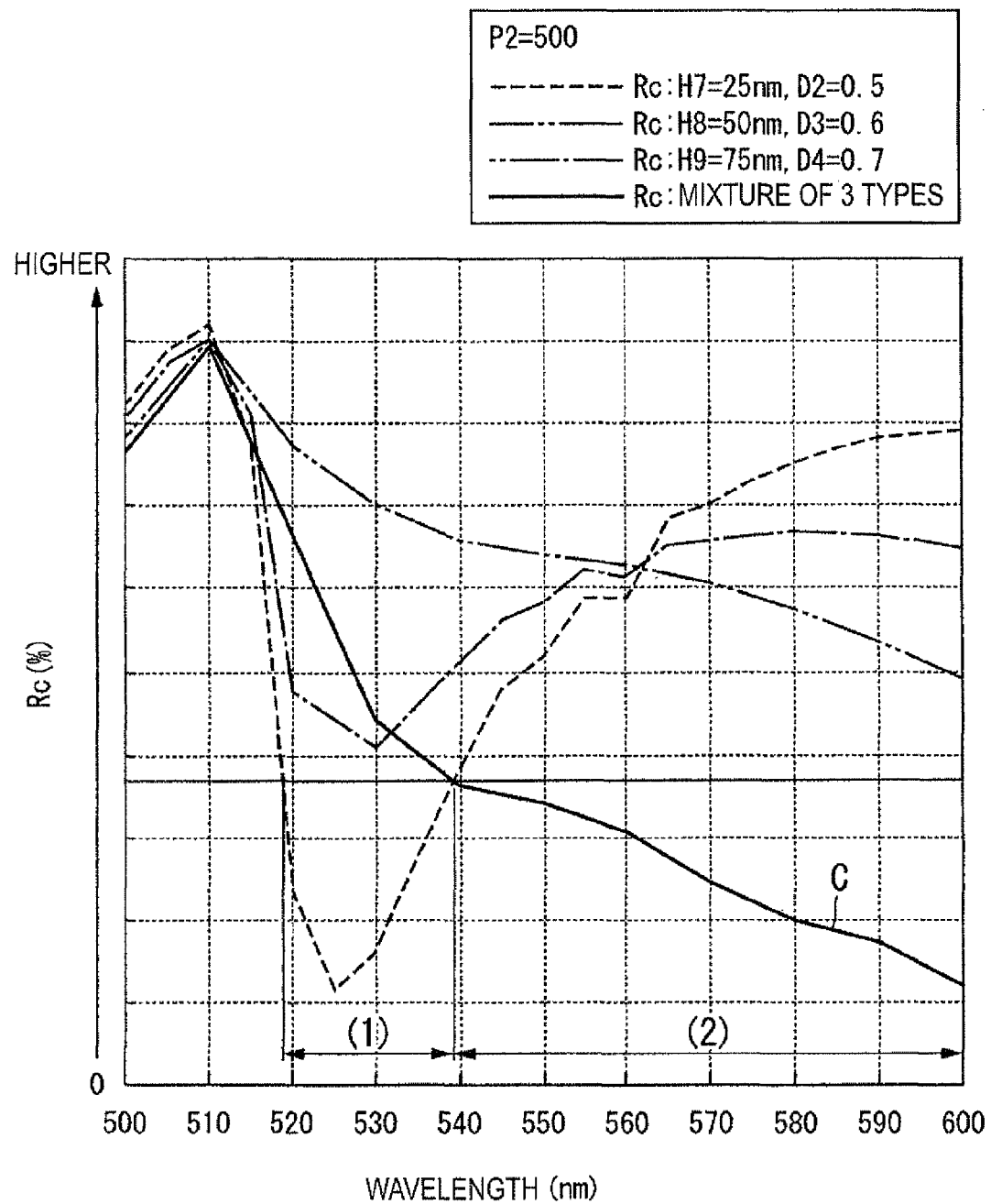
FIG. 10 is a graph showing the reflection characteristic of the third embodiment.

Specifically, the reflectance curve of the polarization element 3 according to the present embodiment becomes to have the shape schematically shown in FIG. 10. FIG. 10 shows the reflection characteristic of the polarization element according to the present embodiment. In the drawing, the lateral axis represents the wavelength of the incident light, and the vertical axis represents the reflectance (Rc) with respect to the TE light.

FIG. 10 shows the reflection characteristics of the respective three types of resonant gratings having the arrangement pitch P2 of the protruding sections of each of the grid sections of 500 nm, the heights (H7: 25 nm, H8: 50 nm, and H9: 75 nm) and the proportions (D2: 0.5, D3: 0.6, and D4: 0.7) of the protruding sections of the respective grid sections different from each other.

According to FIG. 10, it is understood that the wavelength band in which the reflectance (Rc) with respect to the TE light decreases most significantly is different between the heights and the proportions of the protruding sections also in the present embodiment. In other words, the band of the resonant wavelength varies in accordance with the protrusion height and the proportion of the protruding sections.

Taking the curve U of the reflection characteristic in the resonant grating having the arrangement pitch P2 of the protruding sections of 500 nm, the height of the protruding sections of H8 (=50 nm), and the proportion of the protruding sections of D3 (=0.6) as a reference, the band of the resonant wavelength is shifted toward shorter wavelengths if the height of the protruding sections decreases to 25 nm and the proportion decreases to 0.5 while the band of the resonant wavelength is shifted toward longer wavelengths if the height of the protruding sections increases to 75 nm and the proportion increases to 0.7.

Therefore, the polarization element having the three grid sections, which have the respective heights and proportions of the protruding sections different from each other, mixed with each other becomes to have the reflection characteristic indicated by the solid line C shown in FIG. 10, and is capable of absorbing the reflected light with the frequency included in the broader range of wavelength band (2) from shorter wavelengths to longer wavelengths compared to the reflection wavelength band (1) of the polarization element provided only with the grid sections arranged to have the same height and the same proportion of the protruding sections.

Thus, it is conceivable that the resonant wavelength varies in accordance with the height and the proportion of the protruding sections of the resonant grating.

It should be noted that it is also possible to irregularly arrange a plurality of types of grid sections with the respective proportions of the protruding sections different from each other on the substrate 10.

Projector

Figure 11:
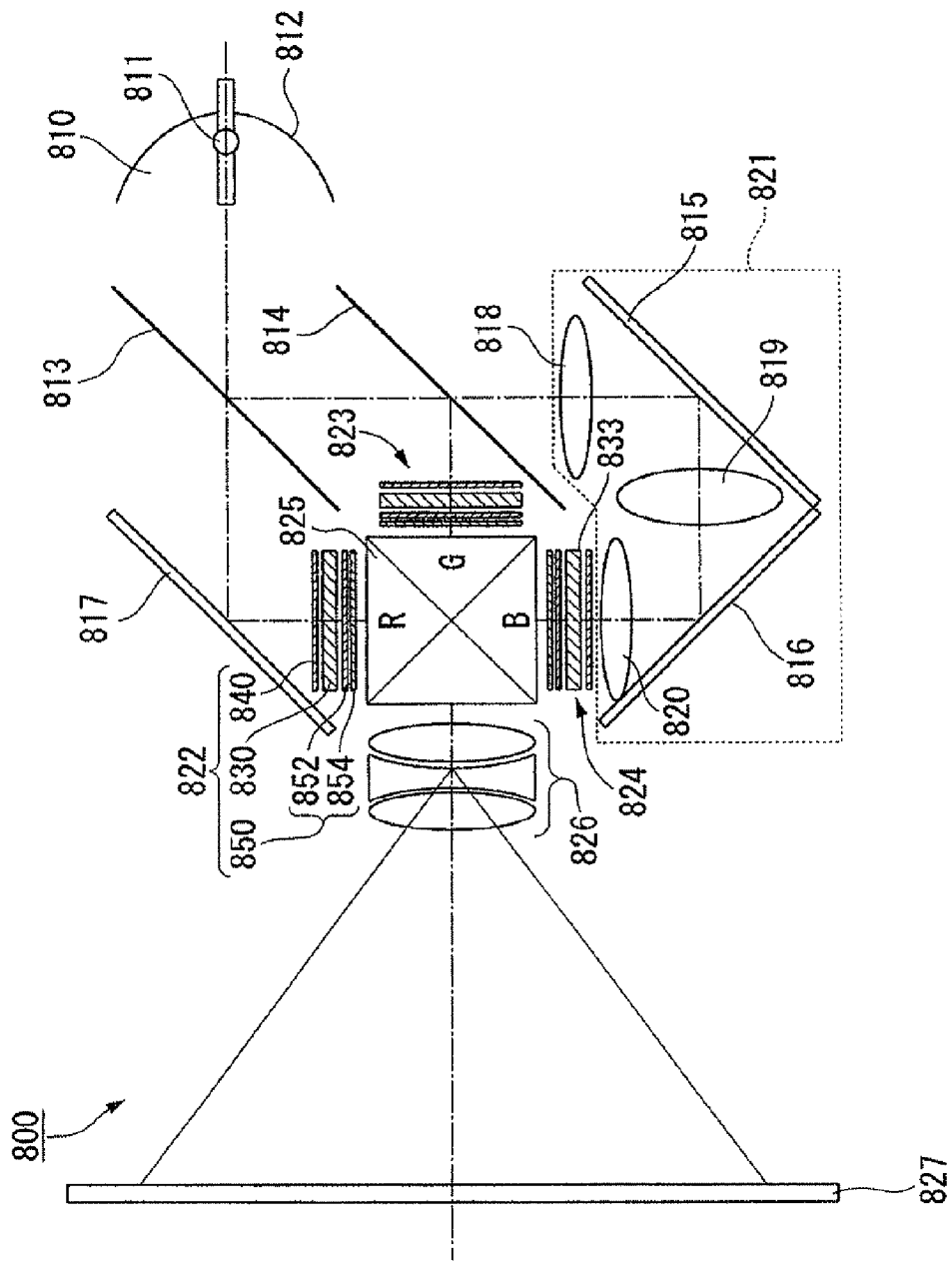
FIG. 11 is a schematic diagram showing an example of a projector.

FIG. 11 is a schematic diagram showing an example of a projector equipped with the polarization element according to the present embodiment of the invention.

As shown in FIG. 11, a projector 800 has a light source 810, dichroic mirrors 813, 814, reflecting mirrors 815, 816, 817, an entrance lens 818, a relay lens 819, an exit lens 820, light modulation sections 822, 823, 824, a cross dichroic prism 825, and a projection lens 826.

The light source 810 is composed of a lamp 811 such as a metal halide lamp, and a reflector 812 for reflecting the light of the lamp. It should be noted that as the light source 810, a super-high pressure mercury lamp, a flash mercury lamp, a high-pressure mercury lamp, a deep UV lamp, a xenon lamp, a xenon flash lamp, and so on can also be used besides the metal halide lamp.

The dichroic mirror 813 transmits red light included in white light emitted form the light source 810, and reflects blue light and green light. The red light thus transmitted is reflected by the reflecting mirror 817, and input to the light modulation section 822 for the red light. Further, the green light out of the blue light and the green light both reflected by the dichroic mirror 813 is reflected by the dichroic mirror 814, and is input to the light modulation section 823 for the green light. The blue light is transmitted through the dichroic mirror 814, and is input to the light modulation section 824 for the blue light via the relay optical system 821 provided for preventing the light loss due to a long light path, and including the entrance lens 818, the relay lens 819, and exit lens 820.

The light modulating sections 822 through 824 each have an entrance side polarization element 840 and an exit side polarization element section 850 disposed on the both sides of a liquid crystal light valve 830 so as to sandwich the liquid crystal light valve 830. The entrance side polarization element 840 and the exit side polarization element section 850 are arranged so as to have the respective transmission axes perpendicular to each other (the cross-Nicol arrangement).

The entrance side polarization element 840 is a reflective type polarization element, and reflects the light having the oscillation direction perpendicular to the transmission axis.

On the other hand, the exit side polarization element section 850 has a first polarization element (a pre-polarization plate, a pre-polarizer) 852, and a second polarization element 854. As the first polarization element 852, there is used the polarization element according to the present embodiment of the invention described above, having high heat resistance. Further, the second polarization element 854 is a polarization element having an organic material as the constituent material. Both of the polarization elements used in the exit side polarization element section 850 are the absorbing type polarization elements, and the polarization elements 852, 854 absorb the light in cooperation with each other.

In general, the absorbing type polarization element formed of an organic material is easily deteriorated by heat, and therefore, hard to be used as a polarization section of a high-power projector requiring high luminance. However, in the projector 800 of the embodiment of the invention, the first polarization element 852 formed of an inorganic material having high heat resistance is disposed between the second polarization element 854 and the liquid crystal light valve 830, and the polarization elements 852, 854 absorb the light in cooperation with each other. Therefore, the deterioration of the second polarization element 854 formed of an organic material can be prevented.

Further, in order for efficiently transmitting the light beams to be modulated by the respective light modulation sections 822 through 824, the first polarization elements 852 have the heights of the protruding sections on the upper surface of the thin metal wires provided to the respective first polarization elements 852 different from each other so as to correspond to the wavelengths of the light beams to be modulated by the respective light modulation sections 822 through 824. Therefore, it is possible that the light beams can efficiently be used.

The three colored light beams modulated by the respective light modulation sections 822 through 824 are input to the cross dichroic prism 825. The cross dichroic prism 825 is composed of four rectangular prisms bonded to each other, and on the interface therebetween, there are formed a dielectric multilayer film for reflecting the red light and a dielectric multilayer film for reflecting the blue light to have an X shape. The three colored light beams are combined by these dielectric multilayer films to form a light beam for representing a color image. The light beam obtained by combining the three colored light beams is projected on a screen 827 by the projection lens 826 as a projection optical system, thus the image is displayed in an enlarged manner.

Since the projector 800 having such a configuration as described above is arranged to use the polarization element according to the embodiment of the invention described above as the exit side polarization element section 850, even if the high power light source is used, deterioration of the polarization element can be prevented. Therefore, there can be provided the projector 800 superior in grayscale expression, capable of realizing high-quality image display, and achieving cost reduction.

The entire disclose of Japanese Patent Application No. 2010-034377, filed Feb. 19, 2010 is expressly incorporated by reference herein.

What is claimed is:

1. A polarization element comprising:
a substrate; and
a plurality of thin metal wires arranged on the substrate, wherein the thin metal wires have protruding sections and recessed sections alternately arranged in a longitudinal direction of the thin metal wires at a pitch shorter than a wavelength of incident light,
in the plurality of thin metal wires, the arrangement pitch P of the protruding sections is the same, and a proportion (D=L/P) of a length L of the protruding section to the arrangement pitch P of the protruding sections is the same, and
a height of the protruding sections is different between the thin metal wires adjacent to each other.

2. The polarization element according to claim 1, wherein a plurality of groups having a first one of the thin metal wires having the protruding sections with a first height and a second one of the thin metal wires having the protruding sections with a second height is disposed on the substrate, and
a width of the group in an arrangement direction of the thin metal wires is smaller than the wavelength of the incident light.

3. The polarization element according to claim 1, wherein the protruding sections and the recessed sections provided to the same thin metal wire have lengths equal to each other.

4. The polarization element according to claim 1, wherein a plurality of types of thin metal wires having the respective heights of the protruding sections different from each other is arranged irregularly on the substrate.

5. A polarization element comprising:
a substrate; and
a plurality of thin metal wires arranged on the substrate, wherein the thin metal wires each have protruding sections and recessed sections alternately arranged in a longitudinal direction of the thin metal wires at a pitch shorter than a wavelength of incident light,
the arrangement pitches of the protruding sections of the respective thin metal wires are equal to each other, and
the proportion (D=L/P) of the length L of the protruding section to the arrangement pitch P of the protruding sections is different between the thin metal wires adjacent to each other.

6. The polarization element according to claim 5, wherein a protrusion height of the protruding sections with respect to the recessed sections is different between the thin metal wires adjacent to each other.

7. The polarization element according to claim 5, wherein a plurality of groups having a first one of the thin metal wires having the protruding sections with a first proportion and a second one of the thin metal wires having the protruding sections with a second proportion is disposed on the substrate, and
a width of the group in an arrangement direction of the thin metal wires is smaller than the wavelength of the incident light.

8. The polarization element according to claim 5, wherein a plurality of types of thin metal wires having the respective proportions of the protruding sections different from each other is arranged irregularly on the substrate.

9. The polarization element according to claim 1, wherein the thin metal wires, the protruding sections, and the recessed sections each have a rectangular shape in a side view.

10. A projector comprising:
a lighting optical system adapted to emit a light beam;
at least one liquid crystal light valve adapted to modulate the light beam;
at least one polarization element according to claim 1, to which the light beam modulated by the liquid crystal light valve is input; and a projection optical system adapted to project a polarized light beam, which is transmitted through the polarization element, to a projection surface.

* * * * *